(12) United States Patent
Lloyd

(10) Patent No.: US 7,185,608 B2
(45) Date of Patent: Mar. 6, 2007

(54) AQUARIUM ORNAMENTATION SYSTEM

(76) Inventor: Robert Edward Lloyd, 1539 S. Saltair Ave., #106, Los Angeles, CA (US) 90025

(*) Notice: Subject to any disclaimer, the term of this patent is extended or adjusted under 35 U.S.C. 154(b) by 29 days.

(21) Appl. No.: 10/369,035

(22) Filed: Feb. 18, 2003

(65) Prior Publication Data

US 2004/0040514 A1 Mar. 4, 2004

Related U.S. Application Data

(63) Continuation of application No. 09/709,054, filed on Nov. 8, 2000, now abandoned.

(51) Int. Cl.
*A01K 63/00* (2006.01)
(52) U.S. Cl. ..................................... 119/253
(58) Field of Classification Search ............... 119/253, 119/256, 247, 706; 47/83, 41.01, 81.01
See application file for complete search history.

(56) References Cited

U.S. PATENT DOCUMENTS

| | | | | |
|---|---|---|---|---|
| 3,059,091 A | * | 10/1962 | Wenzel | 119/256 |
| 3,803,386 A | * | 4/1974 | Rodrigues | 119/256 |
| 3,892,200 A | * | 7/1975 | Ramsauer | 119/256 |
| 3,924,570 A | * | 12/1975 | Lamonica | 119/256 |
| 4,699,829 A | * | 10/1987 | Willinger | 119/256 |
| 4,986,027 A | * | 1/1991 | Harvey | 47/83 |
| 5,257,596 A | * | 11/1993 | Jones | 119/256 |
| 5,381,625 A | * | 1/1995 | Wente | 47/83 |
| 5,855,982 A | * | 1/1999 | Wechsler | 119/256 |
| 6,332,430 B1 | * | 12/2001 | Santa Cruz et al. | 119/256 |
| 6,619,237 B2 | * | 9/2003 | Robertson | 119/706 |
| 2002/0083901 A1 | * | 7/2002 | Rudolph | 119/256 |
| 2003/0000483 A1 | * | 1/2003 | Haber | 119/706 |
| 2003/0221628 A1 | * | 12/2003 | Leon | 119/706 |

FOREIGN PATENT DOCUMENTS

GB 2059280 * 9/1979 ................. 119/256

* cited by examiner

*Primary Examiner*—Teri Pham Luu
*Assistant Examiner*—Elizabeth Shaw
(74) *Attorney, Agent, or Firm*—Charles R. Sutton

(57) ABSTRACT

A method of ornamenting conduits, cylindrical or otherwise, as well as other tubes, filters, narrow and cylindrical surfaces which can be found in an aquarium or terrarium whereby the tubes, conduits, and cylinders are provided with attachment members on their exteriors and ornaments are provided with attachment members so that the ornaments can be placed on the exteriors of the tubes, conduits, and cylinders enabling the texture or appearance of the exterior to be changed to produce a pleasing and aesthetic effect. The conduits and other aquarium equipment with attachment members on their narrow or cylindrical surfaces, as well as the ornaments with corresponding attachment members or regions are also described.

7 Claims, 11 Drawing Sheets

AQUARIUM ORNAMENTATION SYSTEM

CROSS-REFERENCES TO RELATED APPLICATIONS

This application is a continuation application of application Ser. No. 09/709,054 filed on Nov. 8, 2000 now abandoned. Applicant claims the benefit of the Nov. 8, 2000 filing date of application Ser. No. 09/709,054 pursuant to 35 U.S.C. 120.

STATEMENT AS TO RIGHTS TO INVENTIONS MADE UNDER FEDERALLY-SPONSORED RESEARCH AND DEVELOPMENT

This invention was not made under Federally Sponsored Research and Development. The inventor currently retains all rights.

BACKGROUND OF THE INVENTION

There is an increased awareness of concepts such as the philosophy of Feng Shui and Sick Building Syndrome with respect to employee health and job efficiency. Feng Shui (literal translation—"Wind-Water," referring to two of the principal energies), is the art and science of bringing the energy of one's environment into harmony with one's own energy. According to Feng Shui principles aquariums have a very high amount of positive energy (Water, Air, Light). Aquariums can also help prevent Sick Building Syndrome. They act as a natural air filter that removes room odors, dust, and other airborne allergens. moreover, aquariums have a demonstrated calming effect on humans. Data by Nancy Edwards at Purdue University shows Alzheimer's sufferers are calmer (up to 17%) in the presence of aquariums. Even children love to watch fish.

Keeping aquatic organisms has a long history. From first century Chinese goldfish ponds to modern day public aquariums capable of containing and sustaining captured whales. The art of keeping aquaria will continue to benefit the health and peace of mind of humans ensuring that the containers housing organisms are as visually pleasing as possible is a meaningful contribution to this art.

1. Field of the Invention

This invention falls within the general field of equipment used to control the environmental quality inside and outside of an aquarium. There are a variety of tubes and cylinders that provide necessary functions in modern aquariums. In the pet business or hobby, none of these "tubes" (medium transfer devices), from water siphons, water intakes on pumps, pump output, ball and socket tubes, gas flow (air, $CO_2$), diffusers, water "lift" tubes, to tubes that provide hiding places for the resident fish are designed to be decorative and/or to accept the addition of small decorations to the tube. Attachment means on the non-widened non-planar expanses of certain such said structures may be formed in any manner which is suitable for use under water and allows for quick and easy removal and re-attachment. Suitable means of attachment include plastic snaps, fish hook type fasteners, hook and loop fasteners and the like. A preferred method of attachment involves a slide in groove method with interlocking grooves on the tube and the ornament. Also, slit and prong mechanism s can be used in conjunction with the slide in groove method or independently as the attachment means. In this invention, structures which exist for fish hiding, the maintenance of water purity, and transfer or gasification of fluids, such as filters, lift tubes, conduits and the like are combined with ornamentation so that the environment remains good for the organisms inside the aquarium or terrarium while at the same time there is no sacrifice of aesthetic appeal to the human observer on the outside.

2. Description of Related Art Including Information Disclosed Under 37 CFR Sections 1.97 and 1.98.

The prior art contains attachment grids at the bottom of the aquarium which may or may not be coupled with an undergravel filter. The purpose of these attachment grids is to anchor live plants or ornaments so that they are not disturbed during cleaning of the aquarium or by the animals which live in the aquarium. Such attachment grids require a "flat" or at least "widened" support expanse for the attachment of ornaments within the aquarium. Many artificial aquarium plants currently being manufactured are provided with some form of anchoring base, such as for example a disk-like member, and hence already incorporate a removable coupling means between the plant and the existing anchor.

The prior art also contains ornamental objects releasably mounted to a base at the bottom of the tank and used in combination with a heater. In at least one patent, the base is enlarged into an ornamental contoured structure meant to resemble the bottom of a body of water for scenic purposes. Non-ornamental structures, such as lift tubes can rise up out of this base.

The prior art also contains a mounting element for an ornament that fits onto the end of a conduit thereby holding the conduit submerged while looking good at the same time.

All available ornamental devices are provided with one of two main attachment schemes. Either there is a base as described above, covered by a blanketing material such as gravel or sand which maintains the device at the bottom of the tank and thereby limits its positioning or there is a suction cup. Suction cup type devices are suboptimal since the flexible rubber or plastic cup deteriorates and loses its adhesive quality.

None of the earlier patents suggest the attachment of ornaments to the sides of narrow or cylindrical structures that extend up into the water column, such as, for example, the lift tubes or conduits themselves. Thus, with all the effort to provide ornamentation to an aquarium or enhance its aesth tic appeal, there often remain certain obvious mechanical devices extending into the water. Accordingly it is a principal object of the present invention to provide an apparatus whereby any structure extending into the viewable reaches of the aquatic enclosure can be transmogrified aesthetically to please one visually.

SUMMARY OF THE INVENTION

This invention relates to a system by which narrow, cylindrical, or oddly shaped mechanisms for maintenance of aquarium environmental quality can bear changeable attached ornaments either for the purpose of imparting a natural appearance or an appearance that is otherwise aesthetically pleasing. In designing a coupling member for use with the present invention, it may be found to be commercially desirable to use a cooperating structure matching that of the existing coupling means already present on a plant selected from the above described commercially available artificial plants. In this way, the existing anchor could be removed from the plant, and the plant then fastened, by the same principal of attachment, to the coupling means of the present invention, or directly to its support structures.

The present invention consists of a member, adapted to be received within an environmental enclosure. Such commercial aquariums are produced in a wide range of foot-print sizes, each corresponding to a size designation based on volumetric capacity. It is noted, however, that in general, aquariums are produced with base dimensions each of which are produced with base dimensions each of which are exact multiples of six inches. For example, a 15 gallon capacity aquarium typically has has a length of 24 inches and a width of 12 inches. A 30 gallon aquarium is 36 inches long and 12 inches wide. A larger size tank, such as, for instance, a 70 gallon tank, has a foot-print of 48 inches by 18 inches.

The ornaments attached to the environmental quality maintenance means could take the form of a sleeve that is spiral in configuration such as an unraveled toilet paper tub and the way it attaches could be because it has a natural springiness or shape memory which causes it to embrace the environmental quality maintenance device. The sleeve instead could take a substanually annular form that is very narrow along the dimension that parallels the axis of the environmental quality maintenance device. It would be like a cylinder that is very short except that it would be split on one side so that it could be placed around the environmental control device. Like the spiral form, it might not have an attachment means that stands up in relief but may instead hold itself on by its very tendency to embrace the environmental quality maintenance device.

The above, and other objects, features and advantages of the present invention will become apparent from the following description read in conjunction with the accompanying drawings, in which like reference numerals designate the same elements.

DESCRIPTION OF THE PREFERRED EMBODIMENT

Figure 1:
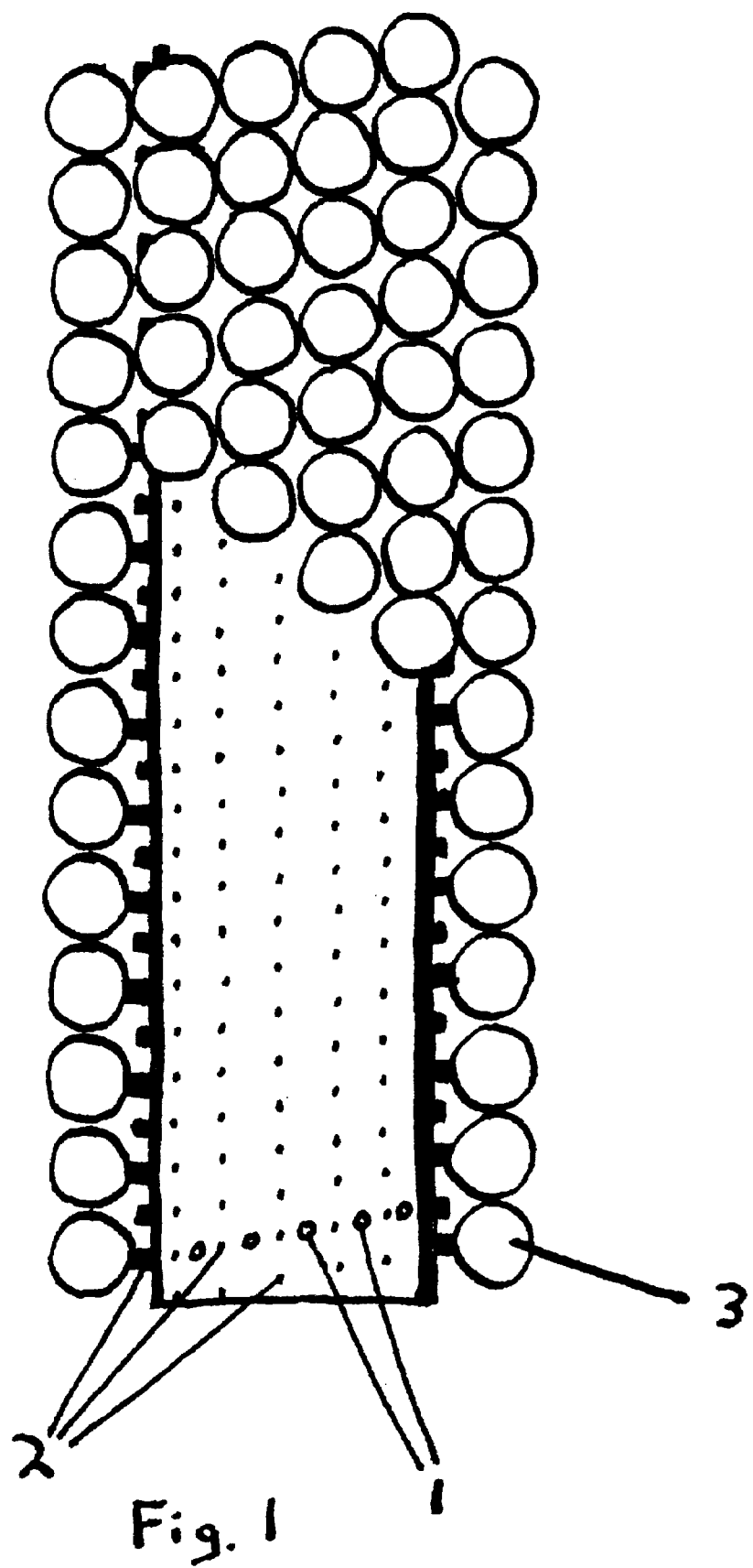
FIG. 1 shows a cylindrical piece of aquarium equipment with a group of ornaments attached.
Figure 2:
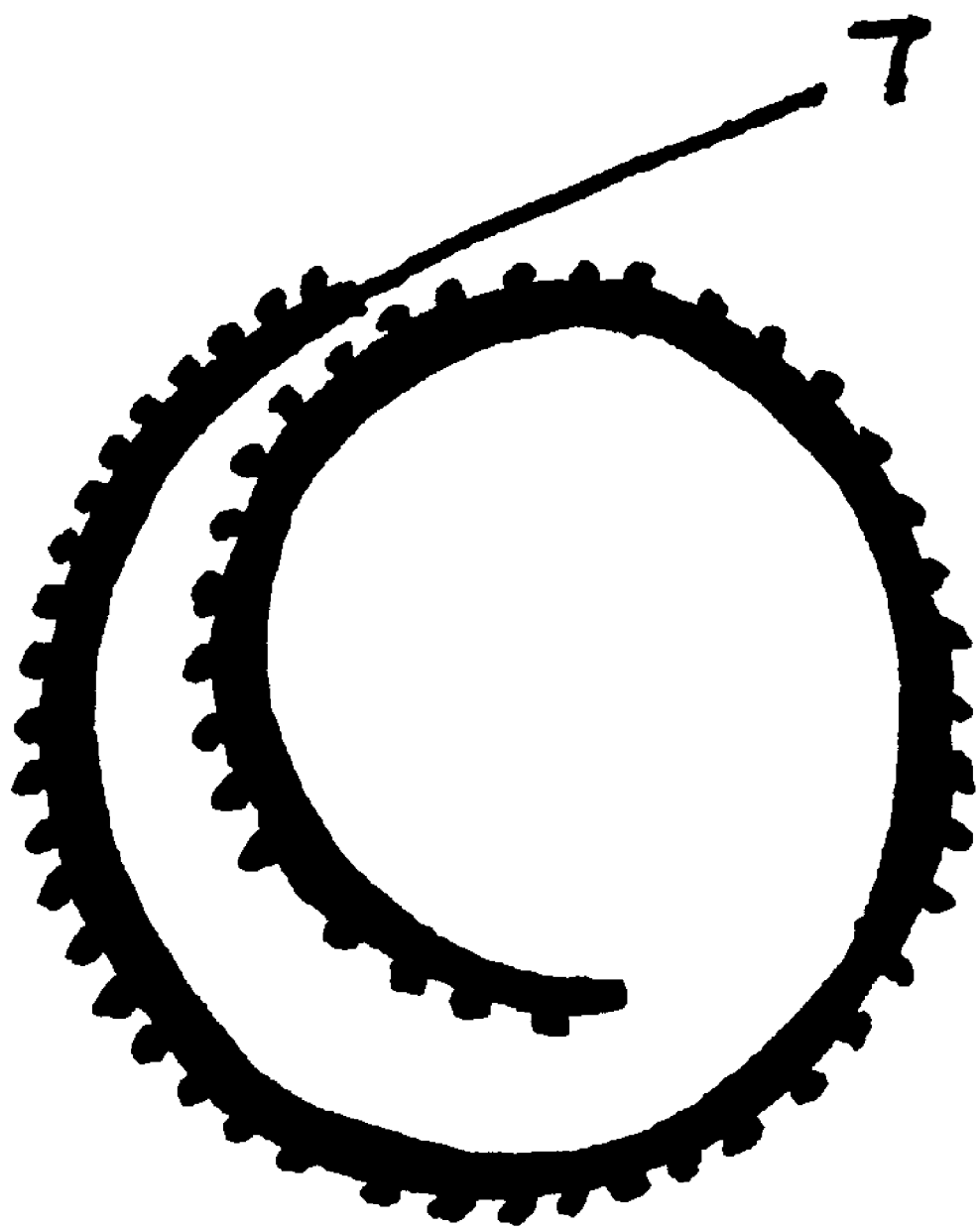
FIG. 2 shows an ornamental attachment which can attach at numerous points and provides a uniform cover.
Figure 3:
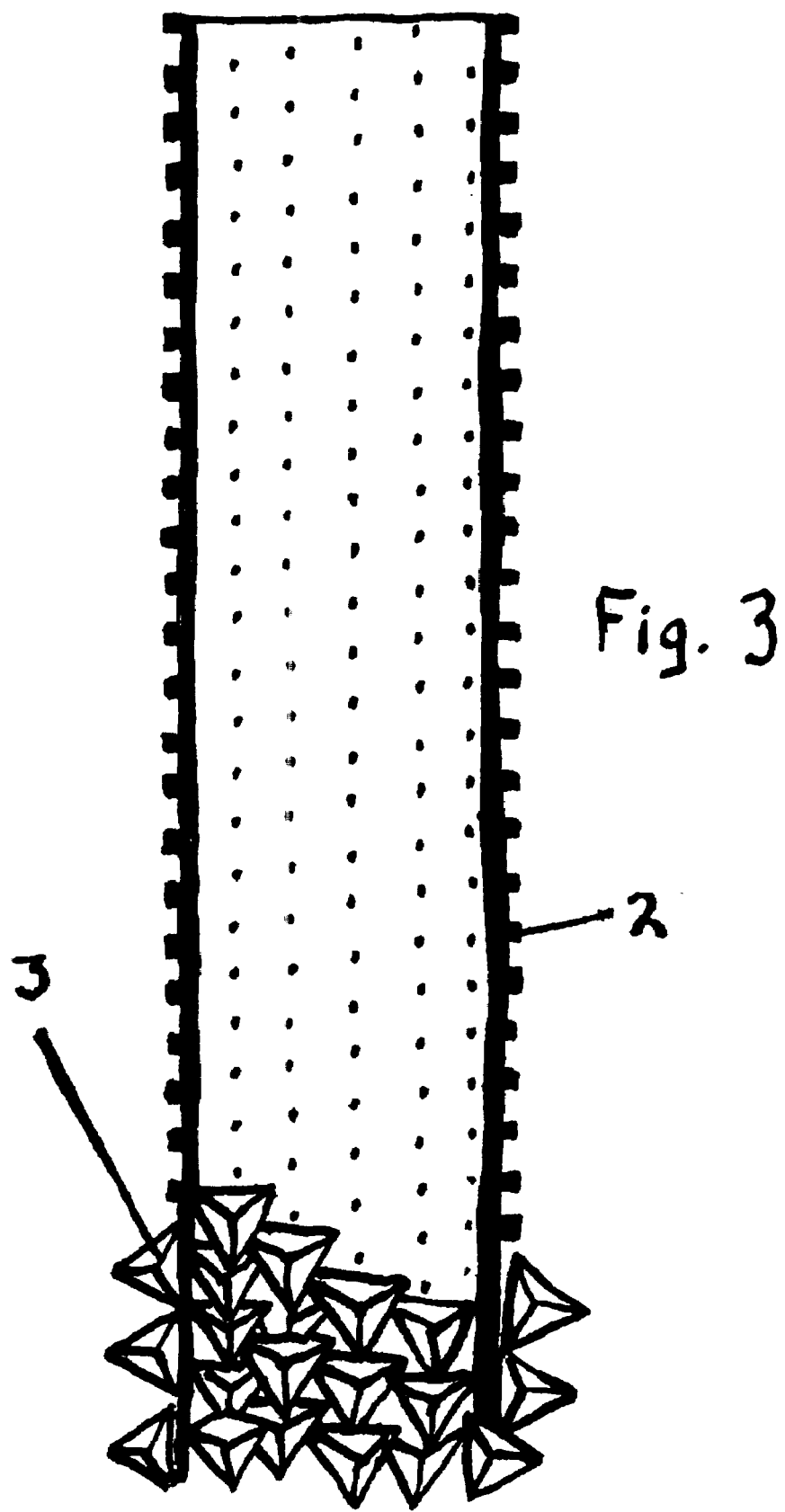
FIG. 3 shows a cylindrical piece of aquarium equipment with abstract ornaments attached.
Figure 4:
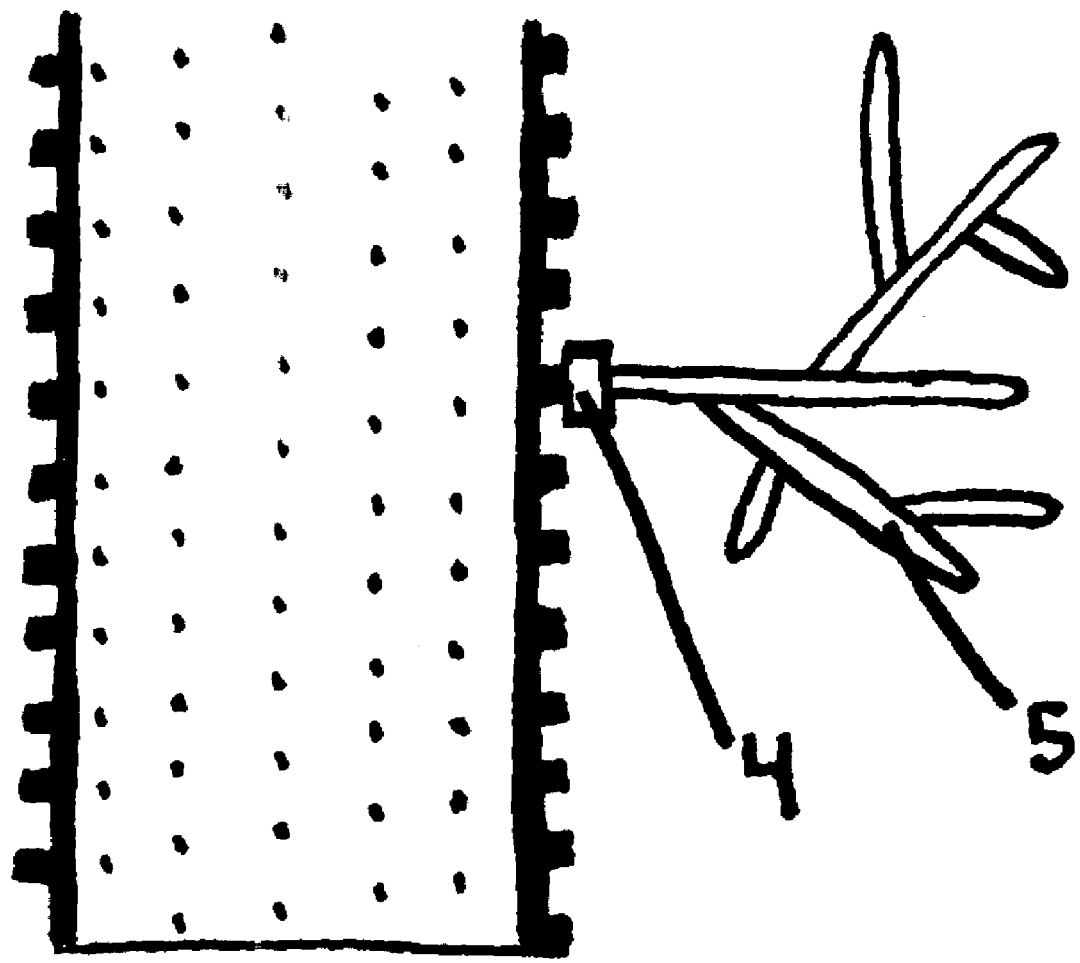
FIG. 4 shows a cylindrical piece of aquarium equipment with a live plant attached.

The object of this invention is to make decorative cylinders, conduits, and tubing for aquariums and other small animal containers such as terrariums. This can be a molded product made from a suitable material such as for example plastic or other formable substance which is advantageously not adversely affected by submersion in water. This tubing could simply be colored to simulate natural colors as a disguise or, conversely, brightly colored with neon or flourescent colors to stand out. The tubing could also be more sophisticated and accept small decorations that would disguise or decorate it. The small decorations would be made to attach to either holes (1), loops, or protrusions (2) molded into or attached to the surface of the tube. They may snap into place or even use VELCRO™ or magnetism to remain fastened. They may use spring tension as mentioned above.

A variety of objects can fit into or onto the holds provided on the plastic tubing, etc., described above. Suitable attachment mechanisms must securely attach the objects to the holds while allowing for removal if necessary. Such devices may be hanging hooks, clips, suction cups, or the like. These small decorations (3) can simulate natural items such as rocks, leaves, (water lily fronds), plant fronds, branches, animals (particularly fish), etc. They can also simulate man made items such as toys, holiday ornaments, vehicles, living structures, etc. Upon reference to the foregoing specification those skilled in the art will appreciate that the method disclosed by the applicant herein provides a manner in which non-planar and narrow-width expanses extending into regions other than the substrate can be transmogrified. The decorations can also be geometric or abstract shapes such as cubes, rings, spheres (which would go well with marble substrates), pyramids, and other doodads. Another type of object that could be made to fit into or onto the holds of the plastic tubing is a live plant rooting or attachment medium (4) and a live plant itself (5). In the interest of clarity, however, the multifold configurations the invention can have have not been listed exhaustively in this specification. Their numerosity is limited only by the outer boundaries of designer imagination.

The tubing and other cylinders here lumped under the general phrase "conduit" (6) would be made in a variety of lengths and internal diameters to replace any or all of the existing tubing in aquariums. Numerous variations to the disclosed structure will be suggested to those skilled in the art. However, it is to be understood that the present disclosure relates to the preferred embodiment of the invention. For purposes of illustration only, and should not be construed as a limitation of the invention.

Figure 5:
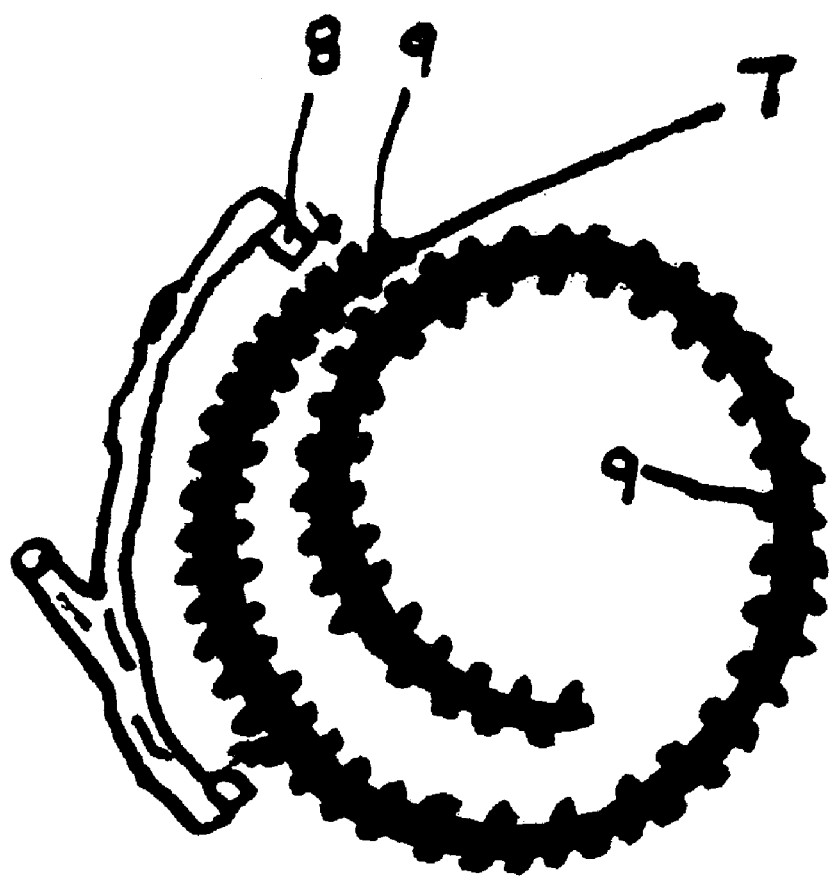
FIG. 5 shows a uniform cover type attachment that can serve as an adaptor upon which yet another attachment can be mounted.
Figure 6:
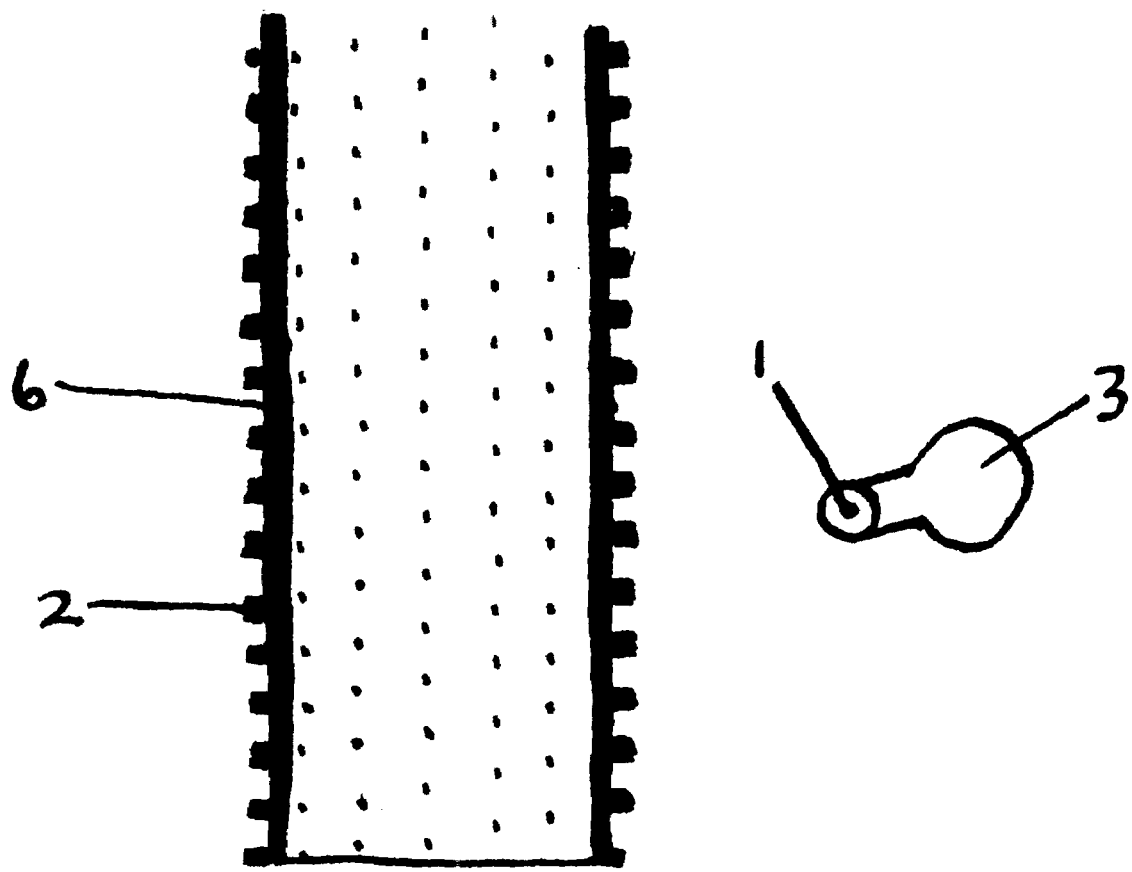
FIG. 6 shows an exploded diagram of a cylindrical piece of aquarium equipment having a male attachment point and a corresponding ornament.
Figure 7:
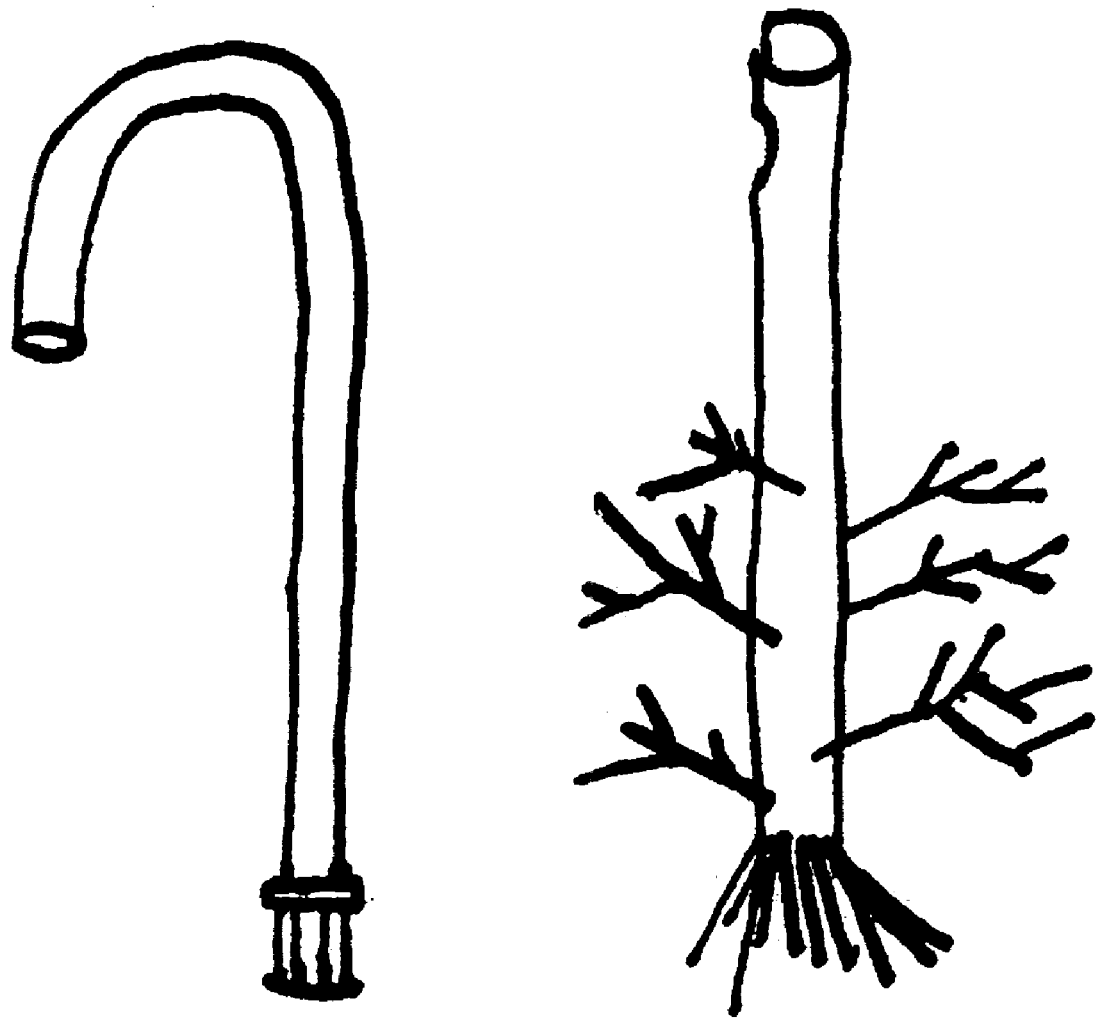
FIG. 7 shows an exploded diagram of a piece of aquarium equipment and the plant-like decoration to cover it.
Figure 8:
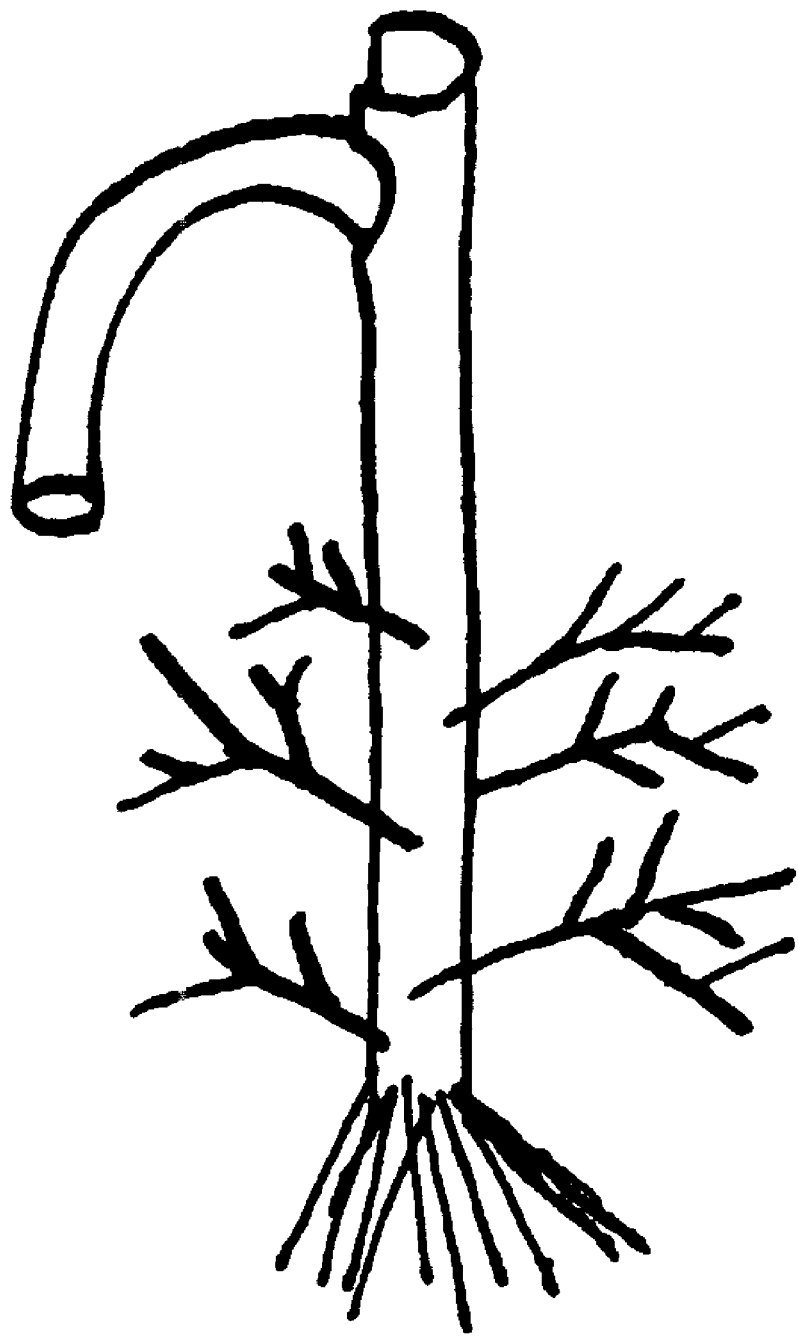
FIG. 8 shows the items from FIG. 7 assembled into a unit.
Figure 9:
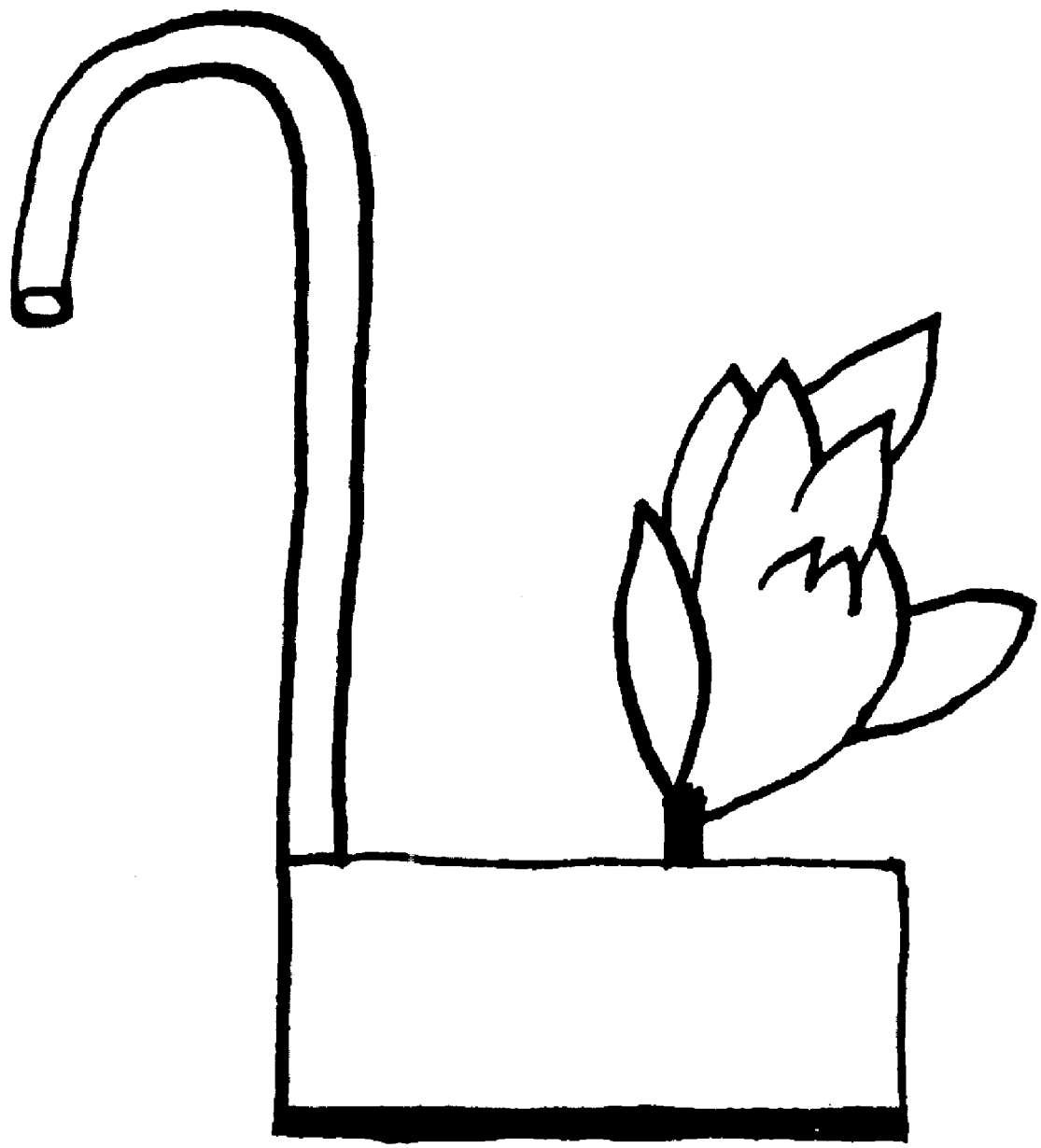
FIG. 9 shows a plant or plant-like ornament attached to a piece of aquarium equipment.
Figure 10:
FIG. 10 shows a piece of aquarium equipment covered by an ornament resembling a candy cane.
Figure 11:
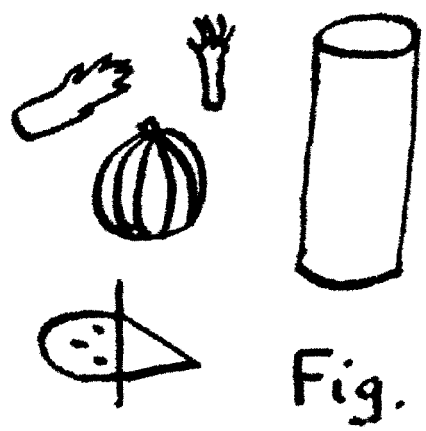
FIG. 11 shows an exploded diagram of a piece of aquarium equipment and some halloween type decorations for it.
Figure 12:
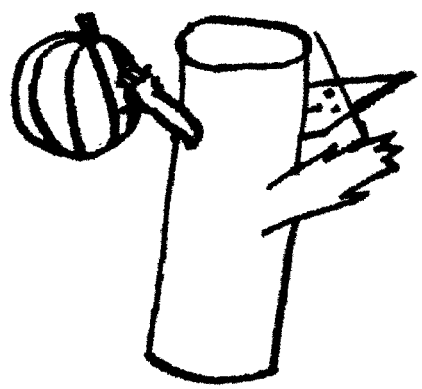
FIG. 12 shows the items from FIG. 11 assembled into a unit.
Figure 13:
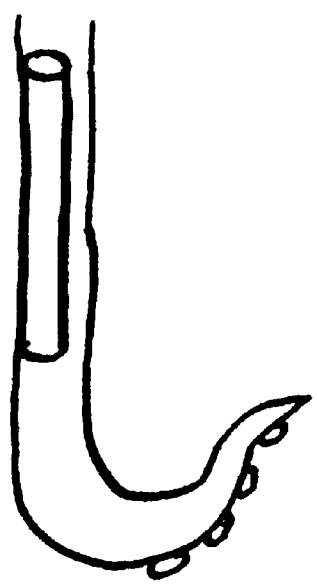
FIG. 13 shows a piece of aquarium equipment that hangs into the water from above covered by an ornament resembling a tentacle.
Figure 14:
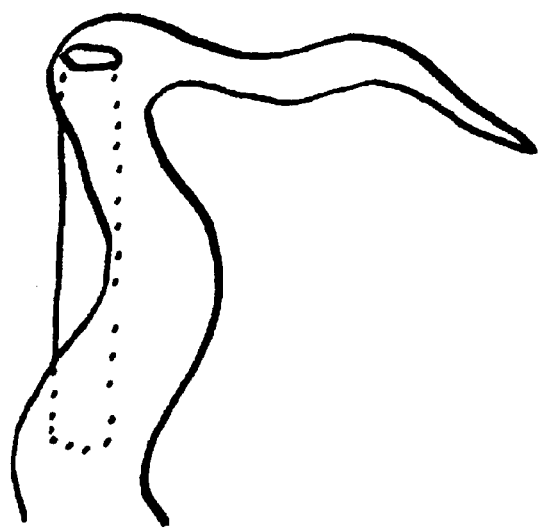
FIG. 14 shows a piece of aquarium equipment that extends up into the water column covered by an ornament resembling a tentacle.
Figure 15:
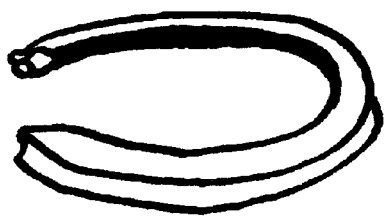
FIG. 15 shows an ornament or adapter that is an annulus or short, substantially cylindrical embodiment of the invention.

A second method of disguising or decorating the tubes and cylinders performing various functions in modern aquariums is to provide a second slightly larger split tube (7) or series of clips that is flexible so that it will fit as a sleeve or clip around the existing tubes. These split tubes would otherwise have many of the same ornamental properties as the solid tubes described above. They could be viewed as an ornament that attaches to a plurality of the attachment holds rather than just one. Alternatively, the split tubes could serve as adapters. It should be understood that the holds shown and described are merely exemplary of a preferred embodiment of the invention presently contemplated by the inventor and that other types of holds can be freely provided and modified in consideration of the operation with respect to which the invention is implemented. For example, in a typical male and female type connection system the existing aquarium device could be covered by female connectors while the desired ornament also has female connectors (8). A split tube sleeve can be placed on the outside of the existing aquarium device which has male connectors (9) on both the inside and outside. The desired ornament can then be attached to the female connectors on the outside of the split tube as seen in FIG. 5. Thus, although there is a strict mating correspondence between the hold configurations, the various fields of holdfasts can be manipulated to provide alternative connective specificities.

Adapters can be made that fit on as few as one connector on the exterior of the environmental quality maintenance device, or which even adhere by springiness or tendency to embrace the device. Adapters can be made which have one or more connector on the outside (with more on the outside comes the possibility of "Y" connectors) or which merely present an appropriate exterior inviting embrace by a springy ornament or adapter.

It is readily apparent that the above described aesthetic unit meets all the objectives mentioned and also has other advantages for use in the aquarium. It should be understood that the specific form of the invention hereinabove described is intended to be representative only, as certain modifications within the scope of these teachings will be apparent to those skilled in the art of artificial environment production.

The invention claimed is:

1. Life-support equipment for use within an enclosure comprising:
   a conduit having an inside and an outside, said outside supporting a first means for attachment;
   a decoration having a second means for attachment and an ornamental surface;
   said second means for attachment cooperating with said first means of attachment so that said decoration is removably attached to said outside of said conduit and said ornamental surface is displayed on said outside of said conduit;
   an adaptor having a first side and a second side, said first side having a third means for attachment, said second side having a fourth means for attachment;
   said third means for attachment cooperating with said first means for attachment so that said adaptor is removably attached to said outside of said conduit;
   said fourth means for attachment cooperating with said second means for attachment so that said decoration is removably attached to said second side of said adaptor and said ornamental surface is displayed on said second side of said adaptor.

2. The life-support equipment according to claim 1, wherein said adaptor is flexible.

3. The life-support equipment according to claim 1, wherein a plurality of said adaptors are connected as a series, said series having a first end and a second end, said first end being removably attached to said conduit and said second end being removably attachable to said decoration.

4. The life-support equipment described in claim 1 further comprising:
   said third means of attachment cooperating with said first means for attachment so that said decoration is susceptible to nutate motion.

5. The life-support equipment described in claim 1 further comprising:
   said fourth means for attachment cooperating with said second means for attachment so that said decoration is susceptible to nutate motion.

6. The life-support equipment according to claim 1 wherein said adaptor is substantially annular.

7. The life-support equipment according to claim 6 wherein said adaptor is a flexible crescent adapted to embrace said conduit.

* * * * *